R. C. NUGENT.

Assignor by mesne Assignments to Phillips, Nimick & Co.

MACHINES FOR FORMING FLANGES ON BOILER-HEADS.

No. 7,834. Reissued Aug. 7, 1877.

Witnesses:
James I. Johnston
Chas. W. Dorn

Inventor:
Richard C. Nugent
By Johnston & Dorn
his attorneys

N. PETERS, PHOTO-LITHOGRAPHER, WASHINGTON, D. C.

UNITED STATES PATENT OFFICE.

RICHARD C. NUGENT, OF DAYTON, OHIO, ASSIGNOR, BY MESNE ASSIGNMENTS, TO PHILLIPS, NIMICK & CO., OF PITTSBURG, PENNSYLVANIA.

IMPROVEMENT IN MACHINES FOR FORMING FLANGES ON BOILER-HEADS.

Specification forming part of Letters Patent No. 166,715, dated August 17, 1875; Reissue No. 7,834, dated August 7, 1877; application filed March 29, 1877.

*To all whom it may concern:*

Be it known that I, RICHARD C. NUGENT, of Dayton, in the county of Montgomery and State of Ohio, have invented certain new and useful Improvements in Machines for Turning Flanges on Boiler-Heads; and I do hereby declare that the following is a full, clear, and exact description of the same.

My invention relates to an improvement in flanging-machines; and consists in the several combinations of devices hereinafter described.

In order to enable others skilled in the art to which my invention appertains to make and use the same, I would thus describe it, referring to the accompanying drawings, in which—

Figure 1:
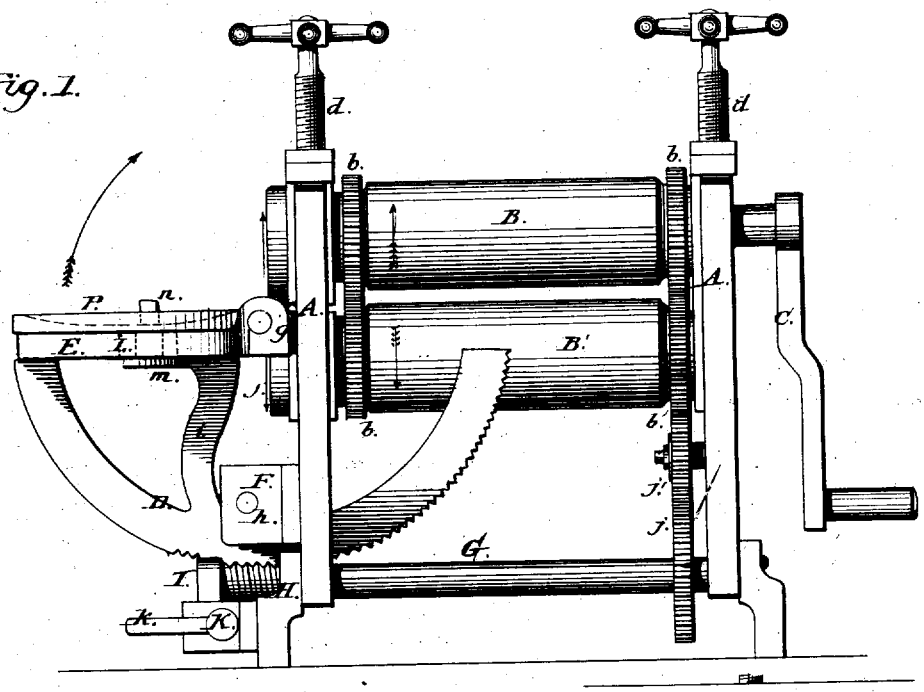
Figure 2:
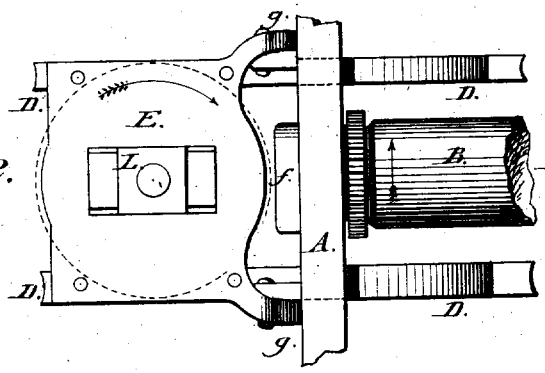
Figure 3:
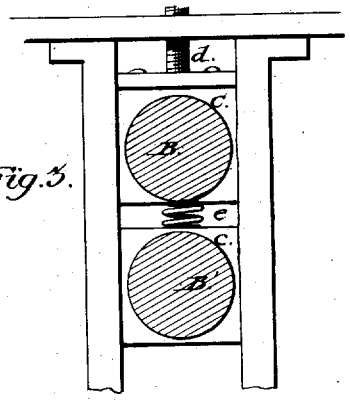
Figure 4:
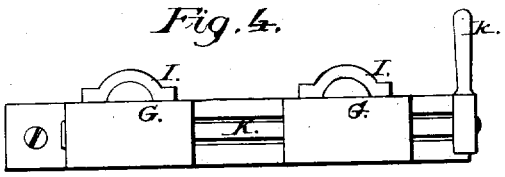
Figure 5:
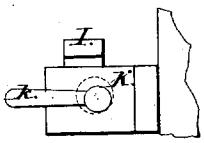

Figure 1 represents a side elevation of my improved machine. Fig. 2 is a plan view of the adjustable feeding-table. Figs. 3, 4, and 5 represent minor devices, which will be referred to respectively.

Corresponding letters of reference indicate like parts.

A A represent the frame of the machine, of any suitable shape and proportions, for supporting in their journals two adjustable rollers, B B′, arranged the one directly above the other. These rollers are connected by gear-wheels *b*, and are driven by any suitable power, a crank, C, being represented in the drawing. The journal-boxes *c*, Fig. 3, are adjustable in their bearings, and are operated by means of the screws *d*, and a spiral spring, *e*, set between them for the purpose of keeping them apart.

These rollers are designed for any of the uses for which plain rolls are employed. The ends of the rollers B B′ project, as indicated at *f f*, from six to ten inches beyond the outside face of the frame-work A, but the rollers B B′ may be dispensed with and two rollers placed on shafts (B B′ representing the shafts) employed instead of the projecting ends *f f* of rollers B B′, the latter arrangement being the most desirable in a machine to be used for the single purpose of flanging boiler-heads.

Figs. 1 and 2, D D represent two segments, to which is bolted a table, E, pivoted at *g*, which point is the center of the circle from which the segments are taken.

It is obvious that the pivot *g* must be moved forward from the front ends *f f* of rollers B B′ in proportion to the increase of the thickness of the disk to be flanged. In the present case the machine is represented as being only capable of flanging one thickness of disk.

The segments pass through the side of the frame-work, and are guided by and work upon rollers *h* in bearings F. Their downward motion is limited by the braces *i* at a point when the table E is perfectly horizontal.

G is one of two shafts, the ends of which are seen in Fig. 4, suitably journaled in the frame-work parallel to the rollers B B′, from which they receive motion by means of connecting-gearing *j j′*. Their forward ends are provided with worms H, which operate the segments D, whose under sides are geared to correspond.

The forward journals I, in which the worm H revolves, are adjustable up and down in boxes, and are placed upon an eccentric or cam shaft, K, Figs. 4 and 5. This shaft has a handle or crank, *k*, for turning it, by doing which the worms are thrown in and out of gear with the segments.

L, Fig. 2, is an adjustable bearing-block, confined in ways in table E, and clamped by means of a nut, *m*. This block is the pivotal bearing in which the central stud of the rotating table P moves. The table P is concave in its upper surface, and has projecting centrally from it a pin, *n*, over which the boiler-head to be flanged is slipped, and by which it is pivoted.

The rotating table P is made concave on its upper side, for the purpose of lessening the friction of the disk of metal to be flanged, which is in the operation of flanging rotated by the rolls B B′. The rotating table P is susceptible of rotation in case of undue strain being brought upon it, which strain may follow the flanging of disks of unusual thickness, and may follow from other causes. The rotating table P should be of a diameter nearly equal to the diameter of the head to be flanged. By this construction of the rotating table P the disk to be flanged is supported near the point where the angle of the flange is formed, and the disk is elevated on a straight line without liability to wabble on its bearing while being flanged.

The operation of my machine may be described as follows: The circular head, either heated or cold, is placed upon the rotating table P, with the pin *n* projecting through a central aperture. The table P is then adjusted upon the table E, so as to have the border of the head extend between the projections *f* of the rollers B B′, and the size of the flange may be regulated accordingly. The adjustable bearing L is now clamped securely in position, and the upper roller brought down upon the head, so as to impinge on it.

The machine is now put in motion, the parts moving as indicated. The friction of the rolls upon the border of the head is sufficient to keep it in constant revolution. The handle of the eccentric shaft K is now turned, throwing the worms into gear with the segments, and the table, carrying the head to be flanged, gradually turns upon its pivotal points *g* in the direction indicated by the arrow, until it assumes a vertical position, and thus the flange is formed. This operation is thoroughly and quickly accomplished, and in such a manner that there is no liability of injury to the head from strain, as is the case in forming flanges by dies and heavy pressure.

I am aware that the English patent No. 66, dated July 10, 1871, granted to Lisman, describes a pair of rolls and mechanism for vertically elevating the plate with relation to the axis of said rolls in the operation of flanging. I do not claim the device described in said patent.

Having thus described my improvement in flanging-machines, what I claim as of my invention is—

1. The combination of the rotating table P with a pivoted table, E, and a pair of rolls, B B′, substantially as herein described, and for the purpose set forth.

2. The concaved rotating table P and the pivoted table E, provided with adjustable bearing L, in combination with a pair of rolls, B and B′, for impinging upon the border of a disk of metal, and rotating it in the operation of flanging said disk, substantially as herein described, and for the purpose set forth.

3. The concaved rotating table P and the pivoted table E, provided with segments D, in combination with worms H, and a pair of rolls for impinging upon the border of a disk of metal, and rotating it in the operation of flanging said disk, substantially as herein described, and for the purpose set forth.

4. The combination of the segments D, worms H, eccentrics K, journal-boxes I, with the pivoted table E, and a pair of rolls, B and B′, substantially as herein described, and for the purpose set forth.

5. The combination and arrangement of the rolls B and B′, rotating table P, pivoted table E, provided with segments D, worms H, eccentrics K, journal-boxes I, shafts G, and operating-gear *j* and *j′*, substantially as herein described, and for the purpose set forth.

RICHARD C. NUGENT.

Witnesses:

JAMES J. JOHNSTON,
WESLEY JOHNSTON.